April 22, 1952        R. E. HOPKINS ET AL        2,594,021
WIDE-ANGLE PHOTOGRAPHIC OBJECTIVE
Filed Aug. 3, 1950

FIG. 1.

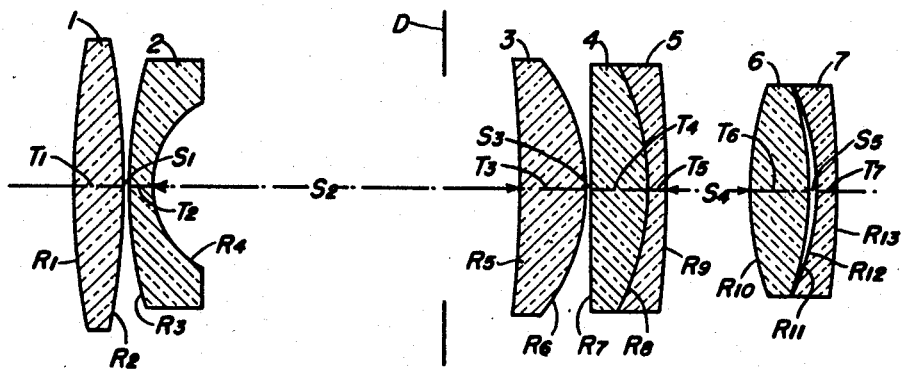

FIG. 2.

| F = 10MM | | | | f/1.5 |
|---|---|---|---|---|
| LENS | $N_D$ | V | RADII MM | THICKNESSES MM |
| 1 | 1.72 | 29.3 | $R_1 = +59.20$<br>$R_2 = -61.65$ | $T_1 = 3.22$<br>$S_1 = .44$ |
| 2 | 1.611 | 58.8 | $R_3 = +44.17$<br>$R_4 = +6.52$ | $T_2 = 1.43$<br>$S_2 = 23.76$ |
| 3 | 1.611 | 58.8 | $R_5 = -304.75$<br>$R_6 = -15.61$ | $T_3 = 4.17$<br>$S_3 = .08$ |
| 4<br>5 | 1.611<br>1.7532 | 58.8<br>27.6 | $R_7 =$ PLANO<br>$R_8 = -17.03$<br>$R_9 = -81.11$ | $T_4 = 4.17$<br>$T_5 = 1.32$<br>$S_4 = 5.30$ |
| 6 | 1.611 | 58.8 | $R_{10} = +15.90$<br>$R_{11} = -20.38$ | $T_6 = 4.02$<br>$S_5 = .20$ |
| 7 | 1.7532 | 27.6 | $R_{12} = -17.17$<br>$R_{13} = -90.35$ | $T_7 = 1.32$<br>B.F.= 15.75 |

*INVENTORS.*
*ROBERT E. HOPKINS*
BY *AND DAVID G. GOLDSTEIN*

*ATTORNEY*

Patented Apr. 22, 1952

2,594,021

UNITED STATES PATENT OFFICE 2,594,021

WIDE-ANGLE PHOTOGRAPHIC OBJECTIVE

Robert E. Hopkins and David G. Goldstein, Rochester, N. Y., assignors to Elgeet Optical Company, Inc., Rochester, N. Y., a corporation of New York Application August 3, 1950, Serial No. 177,526

4 Claims. (Cl. 88—57)

The present invention relates to optics and more particularly to lens systems for photographic purposes.

A primary object of the invention is to provide an improved objective for motion picture cameras in which will be combined the desirable features of a long back focus, permitting locating the focal plane of the field of exposure a greater distance from the back surface of the back lens, a wide field of view, and a large relative aperture.

A further object of the invention is to produce a lens of this character which will be well corrected for spherical aberration, chromatic aberration, distortion, coma, astigmatism and curvature of field.

Other objects of the invention will be apparent hereinafter from the specification and from the recital of the appended claims.

In the drawing:

Fig. 1 is a section showing an objective constructed and arranged in accordance with one embodiment of our invention; and Fig. 2 is a chart of constructional details for a sample embodiment of the invention.

Referring now to the drawing by numerals of reference, we have shown an objective made of three widely separated components. The first component comprises two elements 1 and 2. The second component consists of three elements, 3, 4 and 5; and the third component comprises two elements 6 and 7. Each component is separately made achromatic. The front component 1—2 has negative power and the two rear components have positive power. There is an air space $S_1$ between the two lenses 1 and 2 of the front component; there is an air space $S_2$ between the front and middle components; there is an air space $S_3$ between the lenses 3 and 4 of the middle component; there is an air space $S_4$ between the middle and rear components; and there is an air space $S_5$ between the lenses 6 and 7 of the rear component.

The air space $S_2$ between the front component 1—2 and the middle component 3—4—5 should be as large as the desired size of the objective will permit. In the design shown in the drawing this space $S_2$ is made 2.38 times the focal length. If less, in proportion, it is difficult to correct the spherical aberration for a large aperture. The rear component 6—7 is spaced from the center component 3—4—5 to introduce positive astigmatism but should still be placed as close thereto as possible. The space $S_4$ between the center and rear components in the accompanying showing is .53 times the focal length. If it is made less, the spherical aberration is improved; the field curvature is also improved; but the astigmatism is made more negative. The opposite is true if the space $S_4$ is increased. The power of the negative component 1—2 relative to components 3—4—5 and 6—7 is adjusted to provide for the desired field curvature when combined therewith.

The combination of individual lens elements in the front component 1—2 is made achromatic by using two glasses of widely different dispersive power and of high index. Extra dense flint glasses are most suitable for the positive element 1, while dense barium crowns are most suitable for the negative element 2, the positive element 1 being located on the outside and separated from the other element 2 by space $S_1$ already mentioned. The shapes of these elements is determined primarily by the large amount of distortion they must introduce. The power of this combination of elements is as just mentioned.

The combination of individual lens elements in center component 3—4—5 can be made achromatic by using glasses of the same type as in component 1—2 except that the two positive elements 3 and 4 are dense barium crown and the negative element 5 is extra dense flint. Preferably flint of higher index than that used in lens 1 is employed in lens 5.

The positive elements 3 and 4 of the center component are concavo-convex and plano-convex, respectively, in shape and their concave and plane sides, respectively, should face the front component and also the aperture diaphragm D of the camera, which is interposed between the front and middle components of the system. The lens surfaces of the middle component are therefore predominantly curved toward the aperture diaphragm D.

The elements 3 and 4 of the middle component are air-spaced at $S_3$, as already mentioned, to correct the zonal spherical aberration and the extent of their separation depends upon the amount to be eliminated. The center component 3—4—5 is made as powerful as possible while still maintaining the required spherical correction but its main function is to provide the power of the system and to correct the coma and spherical aberration left over from the other two components.

The rear component 6—7 can be made achromatic by using dense barium crown for element 6 and extra dense flint glass for element 7. The flint used in element 7 should be of higher index than that used in lens 1. The doublet 6—7 is used as an air-spaced lens. The air space $S_5$ is used to provide positive astigmatism and helps to control the zonal spherical aberration. It can also be used effectively to correct some of the oblique rays in the upper part of the beam assuming, for instance, an object to be below the axis in the object space. It is preferable to place the positive element 6 facing the middle component as shown.

Of course the distortion and the astigmatism in component 1—2 cannot be simultaneously corrected. In our present lens, the function of the rear component 6—7 is to provide the necessary positive astigmatism for this correction which, with the form shown and in its spaced relation to the middle component, it most effectively does.

The aperture diaphragm D in the system is located in front of the middle component 3—4—5 at a distance sufficient to allow the use of an iris diaphragm. In the showing of the figure the distance is 4.2 mm.

In the following table the radii (R) of curvature of the lenses, their thicknesses (T), the air spaces (S) between them, the back focal length (BF), the refractive indices ($N_D$) for the D line of the spectrum, the dispersive indices (V), and the focal length (F) for an objective constructed according to one embodiment of the invention are given:

F = 10 mm.    f/1.5

| Lens | $N_D$ | V | Radii mm. | Thicknesses mm. |
|---|---|---|---|---|
| 1 | 1.72 | 29.3 | $R_1 = + 59.20$ | $T_1 = 3.22$ |
|   |      |      | $R_2 = - 61.65$ | $S_1 = .44$ |
| 2 | 1.611 | 58.8 | $R_3 = + 44.17$ | $T_2 = 1.43$ |
|   |       |      | $R_4 = + 6.52$  | $S_2 = 23.76$ |
| 3 | 1.611 | 58.8 | $R_5 = -304.75$ | $T_3 = 4.17$ |
|   |       |      | $R_6 = - 15.61$ | $S_3 = .06$ |
| 4 | 1.611 | 53.8 | $R_7 = -$ Plano | $T_4 = 4.17$ |
|   |       |      | $R_8 = - 17.03$ | $T_5 = 1.32$ |
| 5 | 1.7532 | 27.6 | $R_9 = - 81.11$ | $S_4 = 5.30$ |
| 6 | 1.611  | 58.8 | $R_{10} = + 15.90$ | $T_6 = 4.02$ |
|   |        |      | $R_{11} = - 20.38$ | $S_5 = .20$ |
| 7 | 1.7532 | 27.6 | $R_{12} = - 17.17$ | $T_7 = 1.32$ |
|   |        |      | $R_{13} = - 90.35$ | B.F. = 15.75 |

An objective of the type illustrated with a focal length of 10 has a back focus of 15.75, covers a full field of 46°, and works up to aperture ratios of f/1.5. The specific tabulated data of the above table produces a lens of this type which works at f/1.5 at a focal length of 7 mm.

While the invention has been described in connection with a particular embodiment thereof, however, it will be understood that it is capable of further modification, and this application is intended to cover any variations of the invention following, in general, the principles of the invention, and including such departures from the present disclosure as come within known or customary practice in the art to which the invention pertains, and as may be applied to the essential features hereinbefore set forth, and as fall within the scope of the invention or the limits of the appended claims.

Having thus described our invention, what we claim is:

1. A wide-angle photographic objective of long back focus and large relative aperture for use in a camera, consisting of three coaxial components, air-spaced from one another, the front component being adapted to be positioned in front of the aperture diaphragm of the camera and the middle and rear components being adapted to be positioned behind said aperture diaphragm, the front component being negative in power and the others both positive, the front component introducing negative astigmatism and the rear component introducing positive astigmatism the front component comprising two lenses of different dispersive power and high index which are air-spaced, the front lens of said front component being positive in power and the rear lens of said front component being negative in power, the middle component having its surfaces predominantly curved toward said aperture diaphragm and toward said front component and comprising three lenses, the front two of which are positive in power and the rearmost of which is negative in power and made of glass which has a higher index than the positive element of the front component, the foremost element of the middle component being air-spaced from the two other elements of that component, and the rear component comprising two lenses which are air-spaced from one another, the rear element of the rear component being of higher index than the positive element of the front component.

2. A wide-angle photographic objective of long back focus and large relative aperture for use in a camera, consisting of three coaxial components, air-spaced from one another, the front component being adapted to be positioned in front of the aperture diaphragm of the camera and the middle and rear components being adapted to be positioned behind said aperture diaphragm, the front component being negative in power and the others both positive, the front component introducing negative astigmatism and the rear component introducing positive astigmatism, the front component comprising two lenses which are air-spaced from one another, the front lens of said front component being double convex lens and the rear lens of said front component being a convex concave lens, the middle component comprising three lenses, the foremost of which is air-spaced from the other two and is a concave-convex lens, the other two of said three lenses of the middle component being a plano-convex and a concavo-convex lens, respectively, and the rear component comprising two lenses which are air-spaced from one another, the front element of the rear component being a double-convex lens, and the rear element of said rear component being a concavo-convex lens, the air space between the front and middle components being greater than the air space between the middle and rear components and the two said air spaces between components being greater than any of the air spaces between the different elements of the several components.

3. A wide-angle photographic objective of long back focus and large relative aperture for use in a camera, consisting of three coaxial components air-spaced from one another, the front component being adapted to be positioned in front of the aperture diaphragm of the camera, and the middle and rear components being adapted to be positioned behind said aperture diaphragm, the front component being negative in power and the others both positive, the front component introducing negative astigmatism and the rear component introducing positive astigmatism, the middle and rear component balancing the front component in regard to distortion, the middle component being spaced from the front component a distance which is at least twice the focal length and which is greater than its distance from the rear component, the middle component being spaced from the rear component a distance at least half the focal length and consisting of three lenses whose surfaces are predominantly curved toward said aperture diaphragm and toward said front component.

4. A wide-angle photographic objective of long back focus and large relative aperture for use in a photographic camera, consisting of three coaxial components air-spaced from one another, each of said components comprising a plurality of lenses, the front component being adapted to be positioned in front of the aperture diaphragm of the camera and being negative in power, and comprising a double convex and a convex-concave lens with an air gap between them, the middle and rear components being adapted to be positioned behind said aperture diaphragm and both being positive in power, said middle component comprising a concavo-convex lens, a plano-convex lens and a concave-convex lens, with the front element of the middle component air-spaced from the other two elements of said middle component, the plane face of the plano-convex lens and all the other faces of the elements of said middle component facing said aperture diaphragm and said front component, said rear component comprising a double convex lens and a concave-convex lens air-spaced from one another, the front component of the objective introducing negative astigmatism, the rear component of the objective introducing positive astigmatism, the middle component taking out coma and spherical aberration, and the distortion of the middle and rear components offsetting the distortion of the front component, the air space between the front component and the middle component being 2.38 times the focal length, and the air space between the middle component and the rear component being .53 times the focal length.

ROBERT E. HOPKINS.
DAVID G. GOLDSTEIN.

REFERENCES CITED

The following references are of record in the file of this patent:

UNITED STATES PATENTS

| Number | Name | Date |
|---|---|---|
| 1,578,259 | Boegehold | Mar. 30, 1926 |
| 1,584,271 | Bertele | May 11, 1926 |
| 1,863,099 | Bowen | June 14, 1932 |
| 1,955,590 | Lee | Apr. 17, 1934 |
| 2,317,790 | Mellor | Apr. 27, 1943 |
| 2,391,210 | Warmisham et al. | Dec. 18, 1945 |

FOREIGN PATENTS

| Number | Country | Date |
|---|---|---|
| 388,215 | Great Britain | Feb. 23, 1933 |